Dec. 25, 1956    B. S. WILLIAMS    2,775,348
FILTER WITH BACKWASH CLEANING
Filed Sept. 30, 1953    2 Sheets-Sheet 1

INVENTOR.
Burdell S. Williams
BY
Pollard, Johnston, Smythe & Robertson
ATTORNEYS

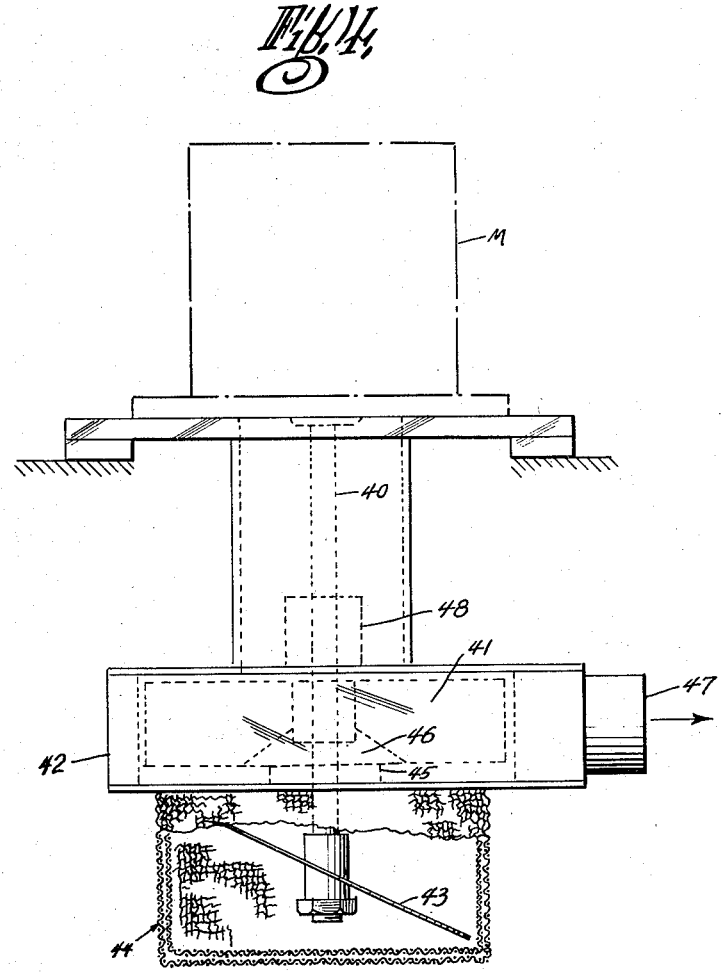

United States Patent Office 2,775,348
Patented Dec. 25, 1956

2,775,348

FILTER WITH BACKWASH CLEANING

Burdell S. Williams, Larchmont, N. Y., assignor to Taco Heaters, Incorporated, Greenwich, Conn., a corporation of New York Application September 30, 1953, Serial No. 383,281

4 Claims. (Cl. 210—94)

This invention relates to strain filters and particularly to strain filters of the suction type that are suitable for attachment to pumps and the like.

Known suction filters are unsatisfactory in many applications, especially in continuously operating machines, for they must be cleaned frequently, and each cleaning requires annoying and often costly interruptions to operations. Moreover, such filters become progressively blocked by the accumulation of deposits thereon, so that even during the operation of the machine, their efficiency or filtering capacity gradually decreases until replacement or cleaning is mandatory.

It is the main object of the present invention to provide a new and improved suction filter which maintains maximum efficiency at all times. More particularly, the present invention provides a suction filter which is kept free and clear of deposits of matter while concomitantly performing its filtering function.

Another object of the invention is to provide a suction filter that may be cleaned during filtering operations without objectionably affecting flow through the filter.

The apparatus of this invention, in general, comprises a perforate screen shaped to form a cylindrical chamber that is open at one end, this end communicating with a source of suction or lower pressure relative to the intake so that fluid in the space around the filter will be drawn through the screen and will flow toward the source of suction. Within the filter chamber, a swash plate is disposed obliquely to the axis of the chamber, and is fixedly mounted for rotation in the chamber on a motor driven shaft substantially coaxially with the chamber axis, the plate being mounted on the shaft at such an angle that the plate extends longitudinally substantially the entire length of the chamber and transversely across the chamber dividing the chamber into two separate portions. In this way, that portion of the chamber on the side of the plate near the source of suction is always in communication with such source of suction whereas that portion of the chamber on the other or remote side of the plate is cut off from the suction. It will be seen therefore that when suction is produced, fluid will be continuously drawn through the screen filter and into the chamber, passing through that portion of the chamber on the side of the plate near the source of suction. As the plate is rotated, fluid will be drawn into that portion of the chamber on the remote side of the plate by the suction action produced by the leading edge of the rotating plate, and such fluid will be subsequently forced outwardly through the filter by the trailing edge of the rotating plate, the expelled fluid purging the screen of any matter deposited thereon. The area of lower pressure relative to the intake may be created by subjecting the outside of the filter to a pressure higher than on the downstream side of the filter.

By this construction, the plate sweeps the entire inner surface of the screen. The rotation of the plate sets up a slight pressure area in front of the moving plate and a suction area behind the plate. This action produces a pulsating pressure through the portion of the screen adjacent the edge of the plate that causes fluid to be alternately drawn in or forced out through part of the filter. Because a portion of the chamber on one side of the plate is continuously communicating with the source of suction, the action of the plate does not objectionably interfere with the suction set up to draw fluid through the filter into the pump, or other device, using the fluid.

According to another embodiment, the filter may be arranged around the motor shaft driving the pump with the filter plate fixed directly to the shaft. The pump inlet may open directly into the filter so as to draw fluid through the filter directly into the pump inlet. Particular advantages of this arrangement are that a single driving shaft may be used and the pump member may be disposed below the liquid level of the fluid being pumped.

These and other objects, features and advantages of the invention will become apparent from the following detailed description of the accompanying drawings which are merely exemplary.

In the drawings:

Figure 4 is a diagrammatic view of another embodiment.

Figure 1:
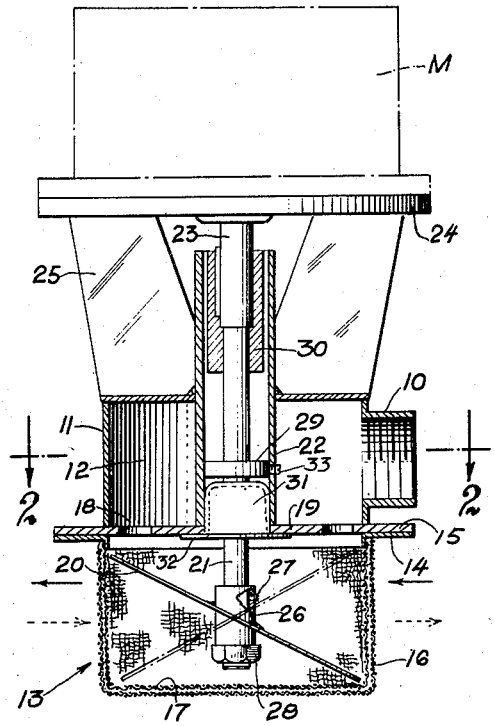
Figure 1 is a longitudinal section, partly in elevation, showing an assembly of a preferred embodiment of a pump filter according to the present invention.
Figure 2:
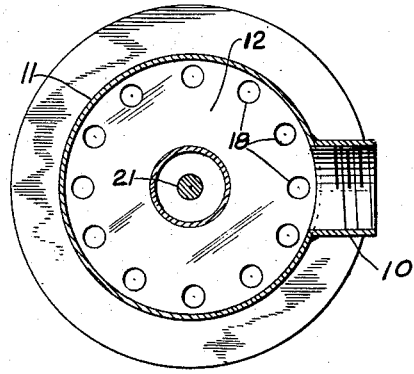
Figure 2 is a transverse section taken along line 2—2 of Figure 1.

Since the details of the pump to which the filter assembly illustrated may be attached form no part of the present invention, it suffices to point out that the filter may be attached to a pump by a suitable connection (not shown) between a nipple 10, which projects laterally from the filter housing 11, and the pump inlet so as to develop in an annular chamber 12 of the filter housing a suction for drawing fluid through the pump filter and then into the pump, as will be presently described.

The filter assembly includes a cylindrical screen, indicated generally at 13, which is closed at one end, preferably by screening material, and open at its other end. At its open end the screen is attached to an annular plate 14 by which it is mounted to one end of the filter housing, plate 14 being bolted to a laterally projecting annular flange 15 of the filter housing. As shown, the screen preferably is a double layer screen, the outer screen 16 having a finer mesh than the inner screen 17; for example, outer screen 16 may be a 60 mesh bronze wire cloth and inner screen 17 may be an 8 mesh steel wire cloth.

Vacuum or suction chamber 12 is open to the space enclosed by the filter screen through a circular series of spaced openings 18 formed in the end wall 19 of the suction chamber bordering such enclosed space so that the suction developed by the pump will draw fluid through the filter screen and into chamber 12 for passage through nipple 10 to the inlet of the pump.

Figure 3:
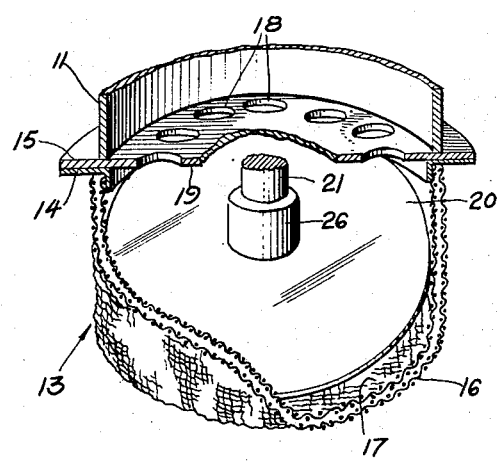
Figure 3 is a perspective view of the filter.

Within the space enclosed by the cylindrical screen, an elliptical-shaped disc or impeller 20 is secured for rotation with a motor-driven spindle 21 which extends along the axis of the filter screen and longitudinally through a sleeve 22, which is concentric with annular chamber 12, for connection with shaft 23 of a driving motor M. Motor M is attached to the other end of filter housing, being bolted to a base plate 24 mounted on webs 25 which extend from the filter housing. Disc 20 is mounted obliquely on shaft 21 by a hub 26 that is set in position on the spindle by set screw 27. A locking nut 28 is threadedly received on the end of the spindle to lock the hub in its set position. It will be noted, as clearly shown in Fig. 3, that the inclination of the disc or impeller to shaft is such that the disc extends diagonally from the top to the bottom of the screen with its peripheral edge proximate the inner wall of the screen.

By this construction the disc sweeps over the entire surface area of the screen side wall as it is rotated, agitating the fluid in the space enclosed by the screen and forcibly ejecting fluid outwardly through the screen to remove dirt or other foreign matter that may have been lodged in the screen. Such a filter allows concomitantly a continuous flow of fluid through the filter and into the pump and a continuous purging of dirt and foreign matter from the screen to keep the screen operating at its optimum efficiency at all times, without interrupting such flow into the pump.

The spindle is rotatably supported by a journal bearing 29 held in place by a set screw 33. The spindle is connected for rotation with motor shaft 23 by an adapter 30 which is fixed on the spindle and is keyed to shaft 23. The suction chamber 12 is sealed from the space within sleeve 22 by a cup-shaped member 31 which has a laterally extending flange 32 fastened to the base 19 of the filter housing 17.

It will be seen that in operation a suction is developed by the pump to which the filter is attached so as to draw fluid through screen 13, over the upper face of disc 20, through openings 18, chamber 12 and nipple 10, and into the pump inlet. Rotation of disc or impeller 20 also produces a pressure area in front of the rotating disc and a suction behind it. At any one radial section of the screen, therefore, fluid will be alternately drawn into the space enclosed by the screen and onward into the pump and forcibly ejected from this space outwards through the screen to maintain the screen clean at all times.

With reference now to Figure 4, a modified arrangement is shown embodying a new combination of pump and filter. This embodiment is similar to the embodiment first described, but differs therefrom in that the pump is mounted on the motor shaft adjacent the filter, the pump opening directly into the filter chamber and forming the outlet therefor.

It will be seen that in this arrangement the pump may be immersed in a tank of liquid.

Motor M drives a shaft 40 to which is attached a pump impeller 41 disposed within a pump housing 42, and an elliptical-shaped disc or impeller 43 disposed within cylindrical filter screen 44. The filter assembly is the same as that described with reference to Figure 1 but here the fluid drawn in through the screen is passed directly through passage 45 into the pump inlet 46, the suction for drawing the fluid into the pump being developed by rotation of the pump impeller. Fluid is discharged through pump outlet shown at 47. Suitable bearing members 48 may be provided to support the pump on the motor driven shaft 40.

While preferred embodiments of the invention have been illustrated and described in detail, it is to be understood that the invention is not limited to these precise embodiments and that various changes and modifications may be made therein by one skilled in the art without departing from the scope of the invention as defined in the appended claims.

What is claimed is:

1. In a filter assembly, a screen adapted to be traversed by fluid passing from one location to a location of lower pressure, said screen defining a cylindrical filter chamber having one end open to said lower pressure so that fluid outside the chamber is drawn through the screen into the chamber and then through said one end to the location of lower pressure, a driving shaft extending axially into the filter chamber, a substantially elliptical plate rotatably carried by said shaft at an oblique angle to the axis of the chamber with opposite ends of its major axis disposed adjacent opposite ends of the chamber, said plate extending transversely across the chamber with its peripheral edge proximate the inner side wall of the chamber and having a suction side adjacent said one end in continuous communication with said lower pressure so that as the plate rotates, it sweeps over the entire inner side wall of the screen, alternately forcing fluid out through the screen and drawing fluid into the cylindrical chamber at each section it passes.

2. In a filter assembly, a double layer screen including an outer perforate member and an inner perforate member of finer mesh than the outer member, said screen defining a cylindrical filter chamber, one end of said filter chamber being at a lower pressure than the other end, a driving shaft extending axially into the filter chamber, a substantially elliptical plate member fixed to said shaft for rotation therewith, said plate extending transversely across the chamber and having a suction side adjacent said end at lower pressure, said plate being angularly mounted on the shaft to extend substantially the entire length of the filter chamber and having its peripheral edge proximate the inner wall of the chamber so that as it rotates, the plate sweeps over the entire inner side wall of the screen, alternately forcing fluid out through the screen and drawing fluid into the cylindrical chamber at each section it passes.

3. In a filter assembly for a pump or the like comprising an annular chamber having an opening adapted to be connected with a pump inlet for effecting a lowered pressure in said chamber, a screen member arranged at one end of said annular chamber to define a substantially cylindrical filter chamber coaxial with said annular chamber, said one end of the annular chamber having openings therein establishing communication between said annular chamber ad the filter chamber for drawing fluid outside the filter chamber through the screen member into the filter chamber and then into said annular chamber for passage to the pump, a motor mounted on the other end of said annular chamber having a shaft extending centrally through said annular chamber and axially into the filter chamber, and an elliptical plate rotatably carried by said shaft at an oblique angle to the axis of the filter chamber with opposite ends of its major axis disposed adjacent opposite ends of the filter chamber, said plate extending transversely across the filter chamber with its peripheral edge proximate the inner side wall of the latter chamber and having a suction side adjacent said one end in continuous communication with said lowered pressure so that as the plate rotates, it sweeps over the entire inner side wall of the screen, alternately forcing fluid out through the screen and drawing fluid into the cylindrical chamber at each section it passes.

4. In a filter assembly, an annular screen for screening liquids, means for effecting flow of a liquid to be screened inwardly through the side walls of the screen and then endwise therein, means for keeping the screen clean including a power-operated shaft disposed substantially coaxial of the annular screen and extending axially therein, and a substantially elliptical plate extending across the screen oblique to said shaft and secured to the shaft to be rotated thereby and having its outer edge disposed close to the inner face of the screen throughout the major portion of its screening surface, and operable as it rotates to force liquid adjacent its outer edge out through the screen to progressively free the screen walls of dirt.

References Cited in the file of this patent

UNITED STATES PATENTS

| | | |
|---|---|---|
| 310,469 | Schlatter | Jan. 9, 1885 |
| 1,421,440 | Fisher | July 4, 1922 |
| 2,198,819 | Holm | Apr. 30, 1940 |
| 2,309,683 | Wahlmark | Feb. 2, 1943 |
| 2,367,935 | Franck | Jan. 23, 1945 |
| 2,394,154 | Curtis et al. | Feb. 5, 1946 |
| 2,482,166 | Gage | Sept. 20, 1949 |
| 2,526,656 | Goetz | Oct. 24, 1950 |
| 2,610,836 | Clarke | Sept. 16, 1952 |

FOREIGN PATENTS

| | | |
|---|---|---|
| 16,713 | Norway | Sept. 21, 1906 |